US011124081B2

(12) United States Patent
Braun

(10) Patent No.: US 11,124,081 B2
(45) Date of Patent: Sep. 21, 2021

(54) SOLAR CHARGING SHOPPING SCOOTER

(71) Applicant: Linda Braun, Mather, PA (US)

(72) Inventor: Linda Braun, Mather, PA (US)

(*) Notice: Subject to any disclaimer, the term of this patent is extended or adjusted under 35 U.S.C. 154(b) by 0 days.

(21) Appl. No.: 17/145,516

(22) Filed: Jan. 11, 2021

(65) Prior Publication Data
US 2021/0245615 A1 Aug. 12, 2021

Related U.S. Application Data

(60) Provisional application No. 62/972,393, filed on Feb. 10, 2020.

(51) Int. Cl.
*B60L 53/51* (2019.01)
*B62K 5/007* (2013.01)
*B60L 50/60* (2019.01)

(52) U.S. Cl.
CPC .............. *B60L 53/51* (2019.02); *B62K 5/007* (2013.01); *B60L 50/66* (2019.02); *B60L 2200/24* (2013.01)

(58) Field of Classification Search
CPC ...................................... B60L 53/51
USPC ......................................... 320/101
See application file for complete search history.

(56) References Cited

U.S. PATENT DOCUMENTS

| | | | |
|---|---|---|---|
| 4,359,121 A * | 11/1982 | Messner | B60L 50/66 180/69.21 |
| 5,894,898 A | 4/1999 | Catto | |
| 7,023,177 B1 * | 4/2006 | Bussinger | B62J 7/06 320/109 |
| 8,448,728 B2 | 5/2013 | Schneider | |
| 10,919,555 B1 * | 2/2021 | Spruill | B62B 5/0423 |
| 2008/0041644 A1 | 2/2008 | Tudek et al. | |
| 2011/0240380 A1 | 10/2011 | Zhao et al. | |
| 2016/0030273 A1 | 2/2016 | Han | |
| 2017/0229903 A1 * | 8/2017 | Jones | H02J 7/1407 |
| 2018/0072164 A1 * | 3/2018 | Plesniak | H02S 20/30 |
| 2020/0031380 A1 * | 1/2020 | Kadiyala | B62B 5/0069 |

* cited by examiner

*Primary Examiner* — Jerry D Robbins
(74) *Attorney, Agent, or Firm* — Boudwin Intellectual Property; Daniel Boudwin

(57) ABSTRACT

A solar charging shopping scooter is shown and described. The solar charging shopping scooter includes a scooter, having a base with a housing affixed to a rear portion of the base. A plurality of wheels movably affixed to the underside of the base. A seat affixed to a top portion of the housing. A basket affixed to the front of the housing. A solar panel is attached to the scooter. The solar panel is capable of charging the scooter. An electrical connection, wherein the electrical connection is configured to attach to a wall outlet.

8 Claims, 4 Drawing Sheets

SOLAR CHARGING SHOPPING SCOOTER

CROSS REFERENCE TO RELATED APPLICATIONS

This application claims the benefit of U.S. Provisional Application No. 62/972,393 filed on Feb. 10, 2020. The above identified patent application is herein incorporated by reference in its entirety to provide continuity of disclosure.

BACKGROUND OF THE INVENTION

The present invention relates to scooters provided at shopping locations. More particularly, the present invention provides a shopping scooter that has a solar charging element.

Some individuals have difficulty moving around. This could be due to an issue walking. In some cases, this is due to age, while in other cases this is due to injury. Shopping establishments have taken to providing electric scooters for shoppers. These scooters allow patrons to easily move about a store and conduct their shopping.

These scooters, however, are often left in the parking lot after a user takes the scooter to their car. This means that not only finding a scooter is difficult, but that, even once found, the scooter may not run. These scooters often run out of charge due to the amount of use. If the scooter is not plugged in after each use it is often rendered inoperable due to lack of charge.

This issue means that, in some instances, consumers will not be able to navigate a store. This will prevent the store from making sales to that consumer. In other scenarios, extra employees are needed to monitor the scooters and bring them back to the charging station.

Consequently, there is a need for an improvement in the art of providing a charged scooter to shoppers. The present invention substantially diverges in design elements from the known art while at the same time solves a problem many people face when needing assistance navigating a shopping location. In this regard the present invention substantially fulfills these needs.

SUMMARY OF THE INVENTION

The present invention provides a solar charging shopping scooter wherein the same can be utilized for providing convenience for the user when using a solar charging shopping scooter. The solar charging shopping scooter is comprised of a scooter, comprised of a base having a housing affixed to a rear portion of the base. A plurality of wheels is movably affixed to the underside of the base. A seat is affixed to a top portion of the housing. A basket is affixed to the front of the housing. A solar panel is attached to the scooter. The solar panel is capable of charging the scooter. The solar charging shopping scooter further includes an electrical connection that will allow the scooter to be charged via a wall outlet.

Another object of the solar charging shopping scooter is to provide a battery located within the housing wherein the solar panel is electrically connected to the battery.

Another object of the solar charging shopping scooter is to provide a motor connected to at least a portion of the plurality of wheels.

Another object of the solar charging shopping scooter is to provide a solar panel that is located beneath the basket.

Another object of the solar charging shopping scooter is to provide a motor control connected to the motor, wherein the motor control will activate the motor moving the scooter.

Another object of the solar charging shopping scooter is to provide a seat that is hingedly connected to the housing.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
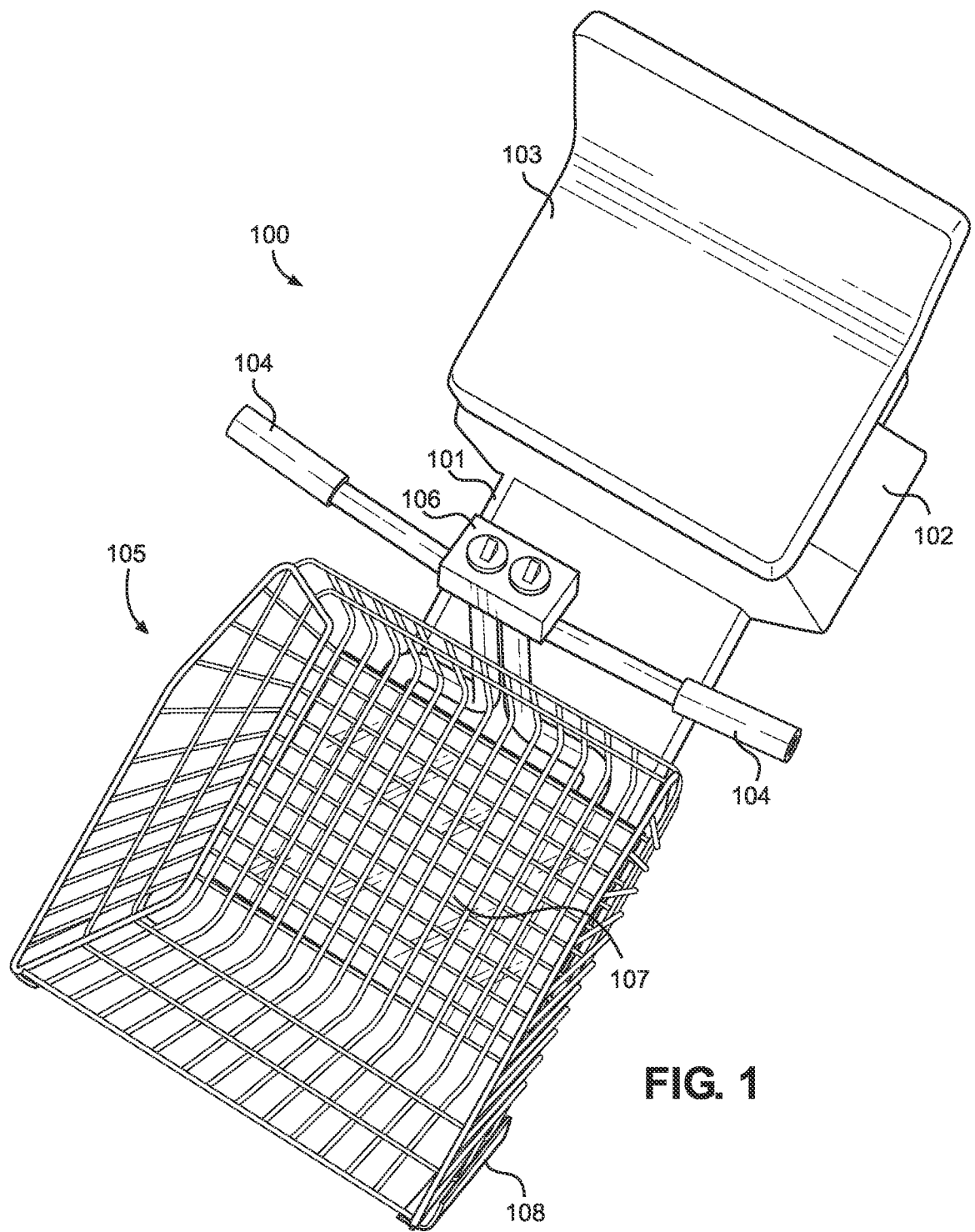
FIG. 1 shows a top down view of an embodiment of the solar charging shopping scooter.

With regard to the reference numerals used, the following numbering is used throughout the drawings.

100 Solar charging shopping scooter
101 Base
102 Housing
103 Seat
104 Steering device
105 Basket
106 Motor control
107 Solar panel
108 Bumper
201 Frame
202 Plurality of wheels
203 Power source
301 Sun's rays
302 wire connections
401 Hinge
402 Seat connection
501 Wall plug
502 Electric motor

DETAILED DESCRIPTION OF THE INVENTION

Reference is made herein to the attached drawings. Like reference numerals are used throughout the drawings to depict like or similar elements of the solar charging shopping scooter. For the purposes of presenting a brief and clear description of the present invention, a preferred embodiment will be discussed as used for the solar charging shopping scooter. The figures are intended for representative purposes only and should not be considered to be limiting in any respect.

Referring now to FIG. 1, there is shown a top down view of an embodiment of the solar charging shopping scooter. The solar charging shopping scooter 100 includes a base 101. In one embodiment the base 101 is a planar base. In other embodiments the base 101 has different proportions to provide comfort to a user. In one embodiment the base 101 has a gripping surface located on a top side thereof. In one embodiment the gripping surface is grip tape. This will allow for the gripping surface to be replaced as needed.

The base 101 has a housing 102 rising therefrom. The housing 102 has an interior volume. In one embodiment the housing 102 rises vertically from a rear of the base 101. There is a seat 103 attached to the housing 102. The seat 103 will be further detailed in FIG. 4.

The solar charging shopping scooter 100 has a handle and steering device 104 attached to a front of the base 101. The handle and steering device 104 rises vertically from the base 101. This will allow a user to steer the solar charging shopping scooter 100 while seated in the seat 103. In one embodiment the handle and steering device 104 is a pair of handle bars. In another embodiment the handle and steering device 104 is a steering wheel. In some embodiments the handle and steering device 104 has a motor control 106 attached thereto. The motor control 106 will be detailed in the description of FIG. 5.

There is a basket 105 connected to the base 101. In additional embodiments the basket 105 is further connected to a portion of the handle and steering device 104. In one embodiment the basket 105 is a metal basket. In another embodiment the basket 105 has a sidewall facing toward the handle and steering device 104. This sidewall has a cut out section such that items may more easily be placed in the basket. In one embodiment there are bumpers 108 located on the outside corners of the basket 105. This will prevent the basket 105 from becoming damaged.

There is a solar panel 107 connected to the underside of the basket 105. The solar panel 107 will be detailed throughout this disclosure. The solar panel 107 is configured to convert sunlight into an electrical charge. The solar panel 107 is located under the basket 105 to protect the solar panel 107 from becoming damaged.

Figure 2:
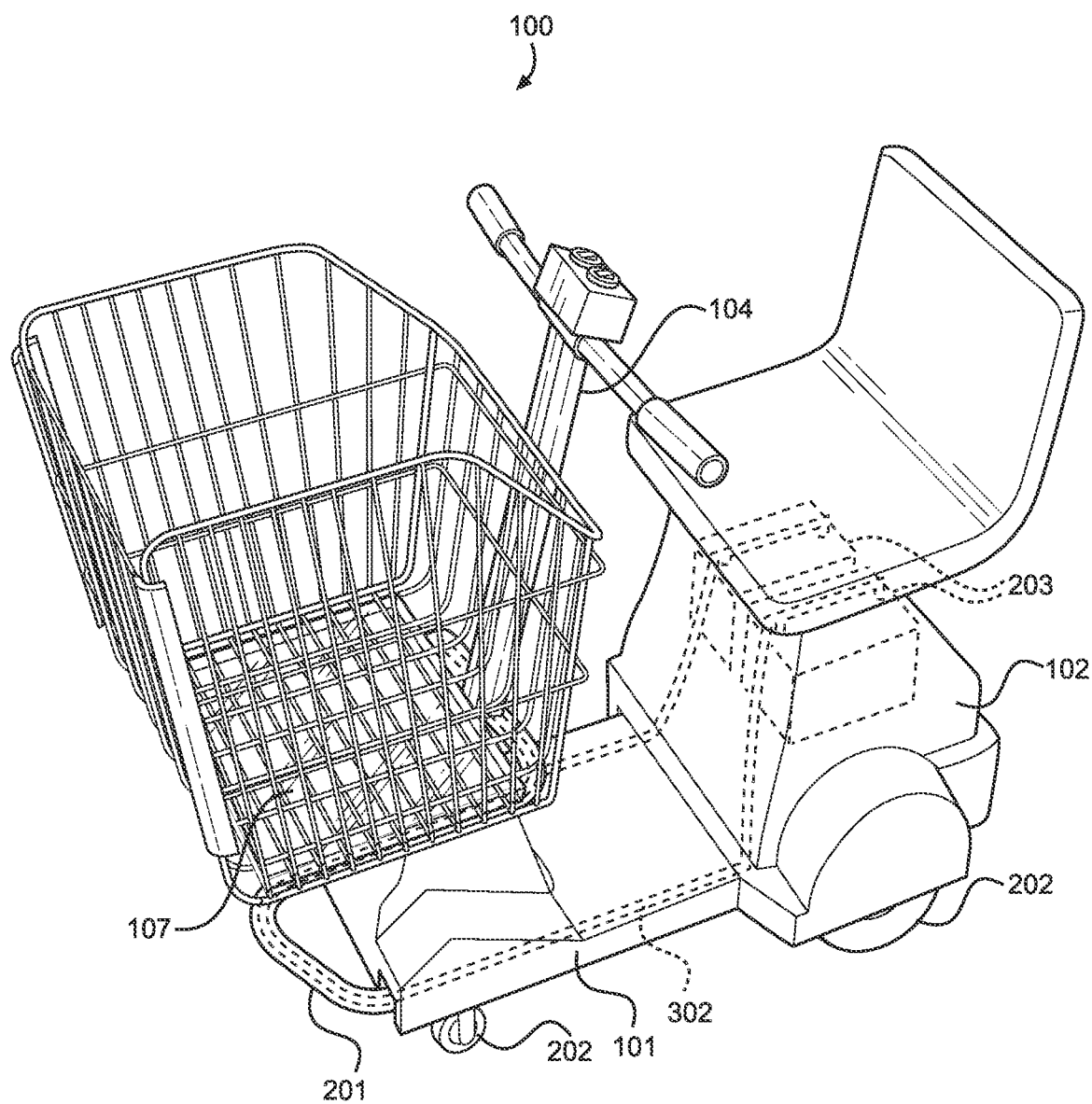
FIG. 2 shows perspective view of an embodiment of the solar charging shopping scooter.

Referring now to FIG. 2, there is shown perspective view of an embodiment of the solar charging shopping scooter. The solar charging shopping scooter 100 further includes a plurality of wheels 202. In one embodiment the plurality of wheels 202 includes a pair of rear wheels. In one embodiment the rear wheels are rubber wheels, in a further embodiment the plurality of wheels 202 includes a pair of front wheels. In another embodiment there is only a single front wheel. In one embodiment the front wheel or wheels are casters.

In this view the handle and steering device 104 has a frame 201 that travels down and around the front of the base 101. The frame 201 then continues beneath the base 101 to the housing 102. In one embodiment the frame 201 is comprising of round tubing. In one embodiment wire connections 302 connected at one end to the solar panel 107 are run into the frame 201. The wire connections 302 exit the frame 201 and enter the housing 102. In other embodiments the wire connections 302 are run along the exterior of the frame 201.

The interior volume of the housing 102 contains at least one power source 203. In the shown embodiment the power source 203 is a battery. The second end of the wire connections 302 are operably connected the power source 203 such that the solar panel 107 charges the power source 203. In another embodiment the solar panel 107 is configured to skip the battery, thereby powering the solar charging shopping scooter 100 directly.

Figure 3:
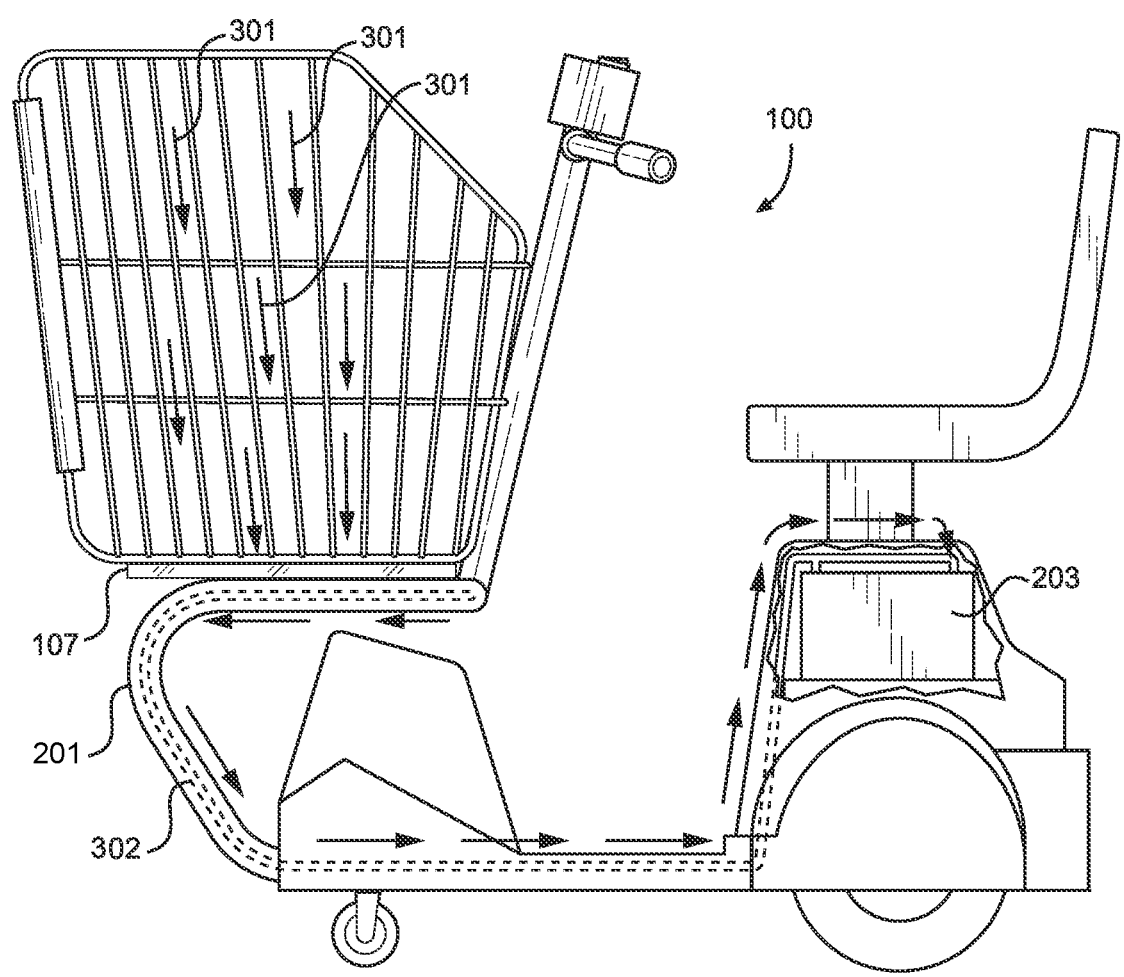
FIG. 3 shows a side view of an embodiment of the solar charging shopping scooter.

Referring now to FIG. 3, there is shown a side view of an embodiment of the solar charging shopping scooter. In the shown embodiment a sample of how the electricity will flow through the solar charging shopping scooter 100 is shown. The process will start when the sun's rays 301 hit the solar panel 107. The solar panel 107 will convert the sun's rays 301 into electric power. The electric power will run through the wire connections 302 and into the power source 203. The power source 203 will then be used to power the solar charging shopping scooter 100 as described in the description of FIG. 5.

Figure 4:
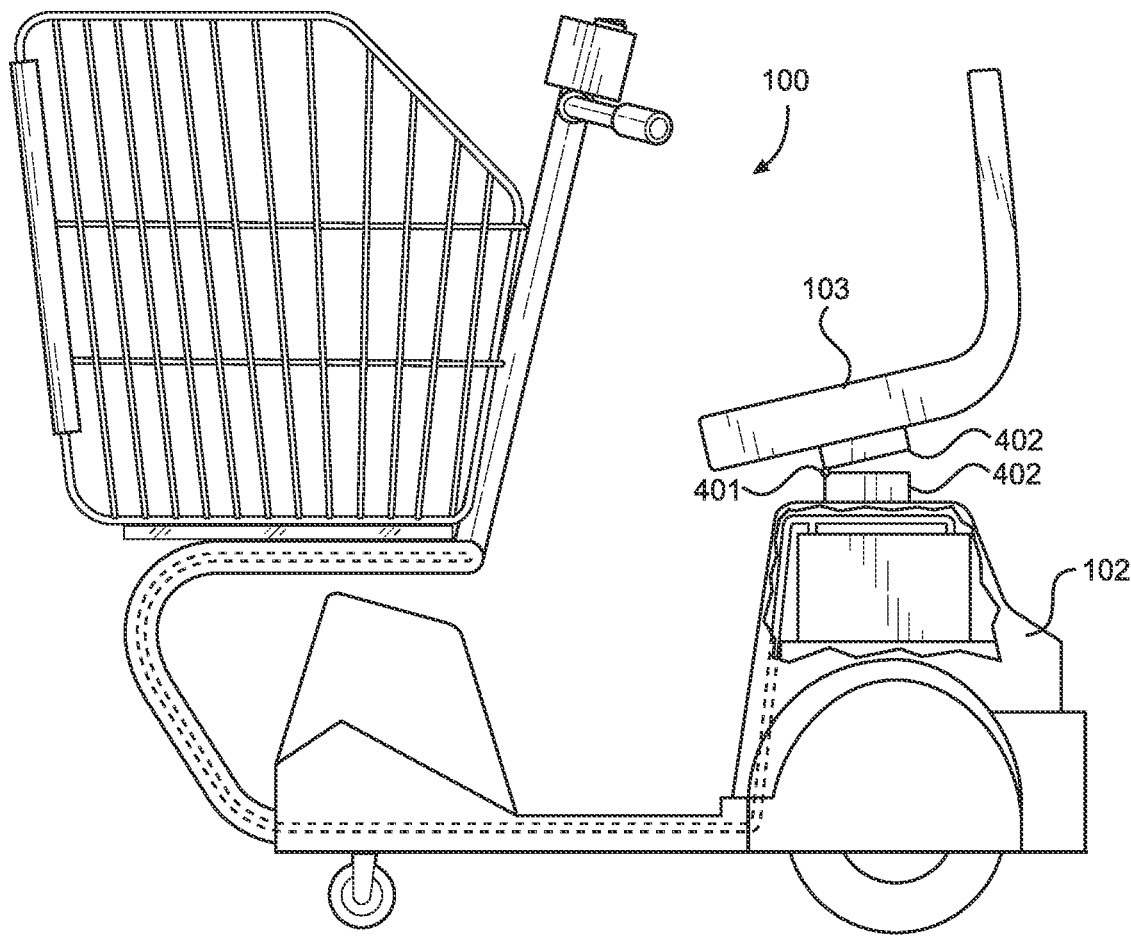
FIG. 4 shows a side view of an embodiment of the solar charging shopping scooter with a hinged seat.

Referring now to FIG. 4, there is shown a side view of an embodiment of the solar charging shopping scooter with a hinged seat. In this FIG. there is an alternative embodiment to the solar charging shopping scooter 100 seat 103 shown. In the embodiment of FIG. 1, the seat 103 is fixed to the housing 102. In the illustrated embodiment of FIG. 4, the seat 103 is hingedly attached to the housing 102. The seat 103 has a hinge 401 located on a front side of a seat connection 402. This will allow the seat 103 to tip forward when not in use. This will protect the seat 103 from various types of weather that can damage the seat or render it uncomfortable.

Figure 5:
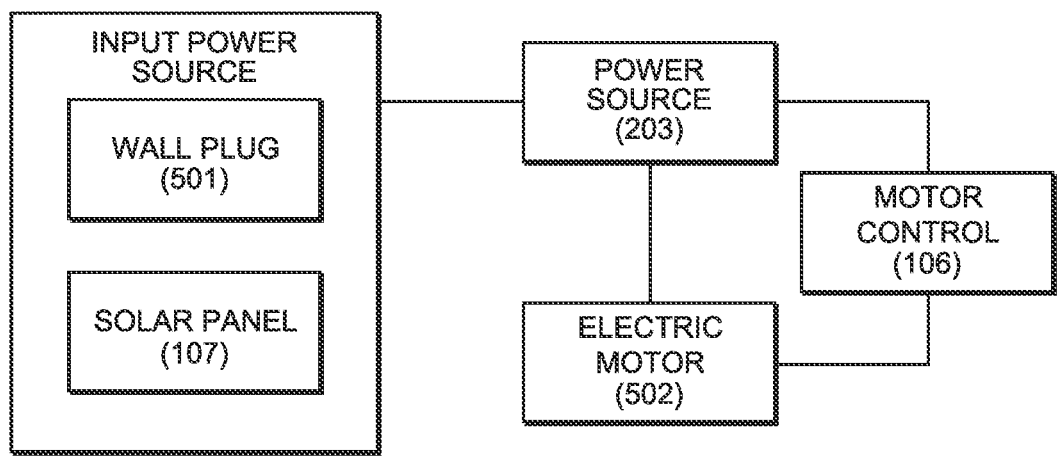
FIG. 5 shows a wire diagram of an embodiment of the solar charging shopping scooter.

Referring now to FIG. 5, there is shown a wire diagram of an embodiment of the solar charging shopping scooter. In other embodiments, other electrical components may be used. The solar charging shopping scooter has a power input source. As described above, the solar panel 107 is one power input. In other embodiments, a wall plug 501 is used as the power input source. In some embodiments, the solar charging shopping scooter has both power input sources 107, 501. The power input sources 107, 501 are coupled to a power source 203. The power source 203 will store power from the power input sources 107, 501. In one embodiment the power source 203 is a battery.

The power source 203 is coupled to at least one electric motor 502. The electric motor 502 is configured to power the plurality of wheels. In one embodiment the electric motor 502 is coupled to only the pair of rear wheels. In another embodiment there is an electric motor 502 connected to each rear wheel. The electric motor 502 will turn the wheels propelling the solar charging shopping scooter.

The power source 203 is further coupled to the motor control 106. The motor control 106 is further coupled to the at least one electric motor 502. The motor control 106 will activate the at least one electric motor 502 in response to input from a user. The motor control 106 will enable the user to select the direction the solar charging shopping scooter travels. Further, the motor control 106 will enable a user to select the speed the solar charging shopping scooter travels. In one embodiment the direction of the solar charging shopping scooter will be determined by controlling each individual electric motor 502 differently. This will allow one electric motor 502 to move faster than the other. This will turn the solar charging shopping scooter.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar charging shopping scooter, the scooter comprising:
    a base having a housing affixed to a rear portion of the base;
    a plurality of wheels movably affixed to the underside of the base;
    a seat affixed to a top portion of the housing;
    a tubular frame extending forward and upwardly from a front end of the housing;
    a basket affixed to an upper end of the tubular frame;
    a solar panel affixed to an underside of the basket, such that the solar panel is at least partially supported by the upper end of the tubular frame;
    a battery disposed within the housing beneath the seat;
    one or more wires electrically connecting the solar panel to the battery, whereby the one or more wires are disposed within a hollow portion of the tubular frame.

2. The solar charging shopping scooter of claim 1, further comprising a motor connected to at least a portion of the plurality of wheels.

3. The solar charging shopping scooter of claim 1, further comprising a motor control connected to the motor, wherein the motor control will activate the motor moving the scooter.

4. The solar charging shopping scooter of claim 1, wherein the seat is hingedly connected to the housing.

5. A solar charging shopping scooter, the scooter comprising:
    a base having a housing affixed to a rear portion of the base;
    a plurality of wheels movably affixed to the underside of the base;
    a seat affixed to a top portion of the housing;
    a tubular frame extending forward and upwardly from a front end of the housing;
    a basket affixed to an upper end of the tubular frame;
    a solar panel affixed to an underside of the basket, such that the solar panel is at least partially supported by the upper end of the tubular frame;
    a battery disposed within the housing beneath the seat;
    one or more wires electrically connecting the solar panel to the battery, whereby the one or more wires are disposed within a hollow portion of the tubular frame; and
    an electrical connection, wherein the electrical connection is configured to attach to a wall outlet.

6. The solar charging shopping scooter of claim 5, further comprising a motor connected to at least a portion of the plurality of wheels.

7. The solar charging shopping scooter of claim 5, further comprising a motor control connected to the motor, wherein the motor control will activate the motor moving the scooter.

8. The solar charging shopping scooter of claim 5, wherein the seat is hingedly connected to the housing.

\* \* \* \* \*